(12) United States Patent
Kaneda et al.

(10) Patent No.: US 7,874,577 B2
(45) Date of Patent: Jan. 25, 2011

(54) VEHICLE INTERIOR PARTS

(75) Inventors: Toshihisa Kaneda, Kanagawa (JP);
Saori Aoyama, Kanagawa (JP); Jirou Watanabe, Kanagawa (JP); Daisuke Tabata, Kanagawa (JP)

(73) Assignee: Kasai Kogyo, Co., Ltd., Kouza-gun, Kanagawa (JP)

( * ) Notice: Subject to any disclaimer, the term of this patent is extended or adjusted under 35 U.S.C. 154(b) by 16 days.

(21) Appl. No.: 12/458,737

(22) Filed: Jul. 21, 2009

(65) Prior Publication Data
US 2010/0019474 A1    Jan. 28, 2010

(30) Foreign Application Priority Data
Jul. 22, 2008    (JP) .............................. 2008-189013

(51) Int. Cl.
*B60R 21/16* (2006.01)
(52) U.S. Cl. ............... 280/728.2; 280/728.3; 280/730.2
(58) Field of Classification Search ............. 280/728.2, 280/728.3, 730.2, 732
See application file for complete search history.

(56) References Cited

U.S. PATENT DOCUMENTS

| | | | | |
|---|---|---|---|---|
| 5,851,023 | A | * | 12/1998 | Nagata et al. ............. 280/728.3 |
| 6,161,865 | A | * | 12/2000 | Rose et al. ............... 280/728.3 |
| 6,991,256 | B2 | * | 1/2006 | Henderson et al. ....... 280/730.2 |
| 7,255,365 | B2 | * | 8/2007 | Geyer et al. ................. 280/732 |
| 7,338,072 | B2 | | 3/2008 | Suekuni et al. |
| 7,568,722 | B2 | * | 8/2009 | Sato et al. ................. 280/728.2 |
| 7,581,751 | B2 | * | 9/2009 | Ochiai et al. ............. 280/730.2 |
| 7,695,001 | B2 | * | 4/2010 | Adler et al. ............... 280/728.3 |
| 7,766,380 | B2 | * | 8/2010 | Tonooka et al. .......... 280/730.2 |
| 7,784,818 | B2 | * | 8/2010 | Downey et al. .......... 280/728.3 |
| 2006/0061072 | A1 | | 3/2006 | Suekuni et al. |

FOREIGN PATENT DOCUMENTS

JP         2006-88731 A       4/2006

* cited by examiner

*Primary Examiner*—Toan C To
(74) *Attorney, Agent, or Firm*—McGinn IP Law Group, PLLC

(57) ABSTRACT

An automotive interior component according to the present invention includes: an interior component attached to a vehicle body panel at an interior side of a vehicle; an airbag installed in a gap between the vehicle body panel and the interior component; an expanding portion defined in a partial region of the interior component, the expanding portion turning in an expansion direction of the airbag to expose an opening; first locking means made up of a first locking piece provided at a rim of the expanding portion and a first engagement portion provided at a fixed portion with which the rim of the expanding portion comes into contact, receiving the first locking piece to lock movement of the expanding portion in a turning direction; and second locking means made up of a second locking piece provided at the rim of the expanding portion and a second engagement portion provided at the fixed portion with which the rim of the expanding portion comes into contact, receiving the second locking piece to lock movement of the expanding portion in a turning radial direction.

6 Claims, 13 Drawing Sheets

VEHICLE INTERIOR PARTS

BACKGROUND OF THE INVENTION

1. Field of the Invention

The present invention relates to an automotive interior component incorporating an airbag.

2. Description of the Related Art

An automotive airbag is intended to inflate and expand between a vehicle occupant and a structural body of a vehicle to protect the vehicle occupant from a direct collision with the structural body of the vehicle due to an inertial force at the time of a collision of the vehicle against an obstacle or another vehicle, etc., to thereby ensure safety of the vehicle occupant. Therefore, an airbag device needs to have a function of sensing a collision and reliably completing expansion and inflation of the airbag within a short period of time until the vehicle occupant collides against the vehicle structural body.

Japanese Unexamined Patent Application Publication No. 2006-88731 discloses art directed to an airbag device installed in a side door of the vehicle, in which an airbag can reliably inflate from an upper portion of a door trim on the side door to the interior of the vehicle upon a side collision of the vehicle.

In the foregoing conventional art, an expanding portion, defined by a groove formed of a thinly-processed core member of the door trim, is structured to turn upward and to be push-opened when the airbag expands and inflates. At this time, a part of the thinly-processed groove breaks whereas the other connected part functions as a hinged portion, thereby achieving an effect that expansion and inflation of the airbag is reliably performed.

In order for the airbag accommodated inside the automotive interior component to smoothly expand and inflate in order to ensure safety of the vehicle occupant, the expanding portion provided in the interior component needs to be instantaneously cleaved to form an opening. For this purpose, as disclosed in the conventional art, a weak portion of low rigidity is provided so as to easily cleave the periphery of the expanding portion to form the opening.

However, the conventional art has entailed a problem that provision of the weak portion in the periphery of the expanding portion as part of the interior component causes the interior component to be misaligned or degraded in appearance due to an occurrence of undulation when it is attached to a vehicle body panel.

In view of the foregoing, an object of the present invention is to provide an automotive interior component, in which an expanding portion can be stably opened at the time of expansion and inflation of the airbag while the appearance and alignment quality of the automotive interior component is assured.

SUMMARY OF THE INVENTION

A first aspect of the present invention is directed to an interior component attached to a vehicle body panel at an interior side of a vehicle; an airbag installed in a gap between the vehicle body panel and the interior component; an expanding portion defined in a partial region of the interior component, the expanding portion turning in an expansion direction of the airbag to expose an opening; first locking means provided at a rim of the expanding portion, the rim being serving as an outer edge during turning of the expanding portion, the first locking means being made up of: a first locking piece provided at the expanding portion; and a first engagement portion provided at a fixed portion with which the rim of the expanding portion comes into contact, receiving the first locking piece to lock movement of the expanding portion in a turning direction; and second locking means provided at the rim of the expanding portion, the second locking means being made up of: a second locking piece provided at the expanding portion; and a second engagement portion provided at the fixed portion with which the rim of the expanding portion comes into contact, receiving the second locking piece to lock movement of the expanding portion in a turning radial direction.

According to the first aspect of the present invention, the first locking means provided along the rim of the expanding portion restricts the expanding portion from moving or undulating in a turning direction, to thereby impart stability. Further, the second locking means restricts the expanding portion from moving or undulating in a turning radial direction, to thereby stabilize an attachment state of the automotive interior component.

A second aspect of the present invention is the automotive interior component according to the first aspect, in which the plurality of first locking means are disposed along the rim of the expanding portion; and the automotive interior component includes an area in which the first locking means are disposed at relatively longer intervals to disengage the first locking means so as to facilitate turning of the expanding portion at a time of inflation and expansion of the airbag.

According to the second aspect of the present invention, the expanding portion is pushed up at the area at which the first locking means are disposed at longer intervals, when the airbag expands and inflates. The first locking means adjacent to the disengaged ones are disengaged one after another, thereby opening the expanding portion. In this manner, such an automotive interior component can be achieved, that the expanding portion is stably cleaved to form an opening at the time of expansion and inflation of the airbag while the quality in appearance and alignment is ensured.

A third aspect of the present invention is the automotive interior component according to the first aspect, in which the second locking means is provided between the first locking means disposed at relatively longer intervals.

According to the third aspect, the second locking means are provided in the area at which the first locking means are disposed at longer intervals, thereby ensuring a stable attachment state to the entire expanding portion.

A fourth aspect of the present invention is the automotive interior component according to the first aspect, in which the plurality of first locking means are disposed along the rim of the expanding portion; and the automotive interior component further includes: third locking means disposed in an area adjacent to the second locking means and an area adjacent to end portions of the expanding portion to disengage the first locking means so as to facilitate turning of the expanding portion at a time of inflation and expansion of the airbag, the third locking means being made of a third locking piece provided at the expanding portion; and a third engagement portion provided at the fixed portion with which the rim of the expanding portion comes into contact, receiving the third locking piece to lock movement of the expanding portion in the turning radial direction.

According to the fourth aspect of the present invention, the second locking means and third locking means for limiting only movement in the turning radial direction are disposed between the first locking means for limiting movement of the expanding portion in a turning direction. In this manner, there is provided an area at which movement in the turning direction is not limited. Thus, turning of the expanding portion begins at this area, thereby facilitating disengagement of the first locking means. Further, disposition of the third locking means in the area adjacent to the end portions of the expanding portion facilitates movement of the end portions in the turning direction, thereby leading to cleavages at the end portions, so that the expanding portion can be stably opened.

A fifth aspect of the present invention is directed to an automotive interior component, including: an interior component main body attached to a vehicle body panel at an interior side of a vehicle; an airbag installed in a gap between the vehicle body panel and the interior component main body; an expanding portion defined in a partial region of the interior component main body, the expanding portion turning in an expansion direction of the airbag to expose an opening; a locking piece provided at a rim of the expanding portion, the rim being serving as an outer edge during turning of the expanding portion; and an engagement portion provided at a fixed portion with which the rim of the expanding portion comes into contact, receiving the locking piece to lock movement of the expanding portion in a turning direction. The locking piece and the engagement portion are provided at a region other than a predetermined region with which a front end portion of the airbag comes into contact at beginning of expansion of the airbag.

According to the fifth aspect of the present invention, turning of the expanding portion in the expansion direction thereof is not limited in the partial region of the expanding portion, with which the front end portion of the airbag comes into contact at the beginning of expansion of the airbag. Therefore, the airbag which has started inflating and expanding can complete inflation and expansion in a prompt manner by easily deforming the aforementioned partial region with the inflation pressure of the airbag. This enables the airbag to exert force on the expanding portion in the expansion direction thereof. Further, since the expanding portion is easily expanded, the airbag can easily inflate and expand in the original direction of inflation and expansion.

A sixth aspect of the present invention is the automotive interior component according to the fifth aspect, further including: first locking means disposed at the rim of the expanding portion, the rim being serving as an outer edge during turning of the expanding portion, the first locking means being made up of: a first locking piece provided at the expanding portion; and a first engagement portion being provided at the fixed portion with which the rim of the expanding portion comes into contact, receiving the first locking piece to lock movement of the expanding portion in the turning direction; and second locking means disposed at the rim of the expanding portion, the second locking means being made up of a second locking piece provided at the expanding portion; and a second engagement portion provided at the fixed portion with which the rim of the expanding portion comes into contact, receiving the second locking piece to lock movement of the expanding portion in a turning radial direction.

According to the sixth aspect, the first locking means provided along the rim of the expanding portion stabilize the expanding portion by limiting movement or undulation thereof in the turning direction. Further, the second locking means limit movement in the turning direction, to thereby stabilize an attachment state of the automotive interior component.

DESCRIPTION OF THE PREFERRED EMBODIMENTS

Hereinafter, the preferred embodiments of the present invention will be described in detail, by way of example of a door trim as an automotive interior component.

Figure 1:
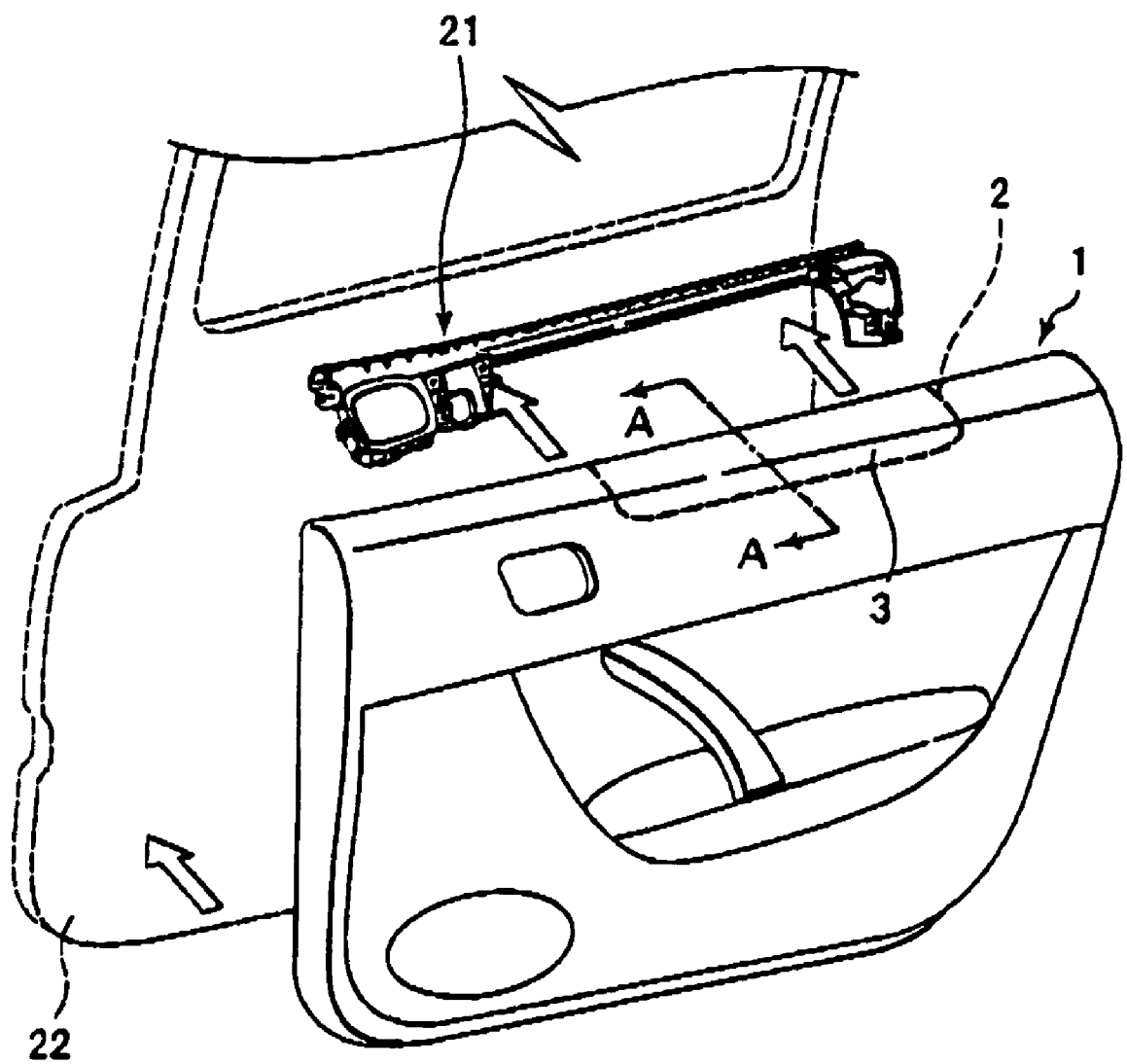
FIG. 1 is a schematic view illustrating an automotive interior component according to the present invention.

FIG. 1 is a schematic view of a door trim 1 as viewed from the interior side of a vehicle. The upper portion of the door trim 1 is fixed to a vehicle body panel 22 via a waist garnish 21 attached to the vehicle body panel 22. As described later, an upper side portion of the waist garnish 21 is in abutment with the upper portion rim, i.e., the so-called waistline, of the door trim 1. At the upper side portion, along a part thereof in contact with a rim of an expanding portion 3, there are provided: first engagement portions (rib receivers 34) for receiving first locking pieces (ribs 31) as first locking means; and second engagement portions (hook receivers 35) for receiving second locking pieces (hooks 32) as second locking means (see FIG. 4). In this embodiment, the first locking means is made up of the ribs 31 and rib receivers 34, whereas the second locking means is made up of the hooks 32 and the hook receivers 35. The waist garnish 21 is a fixed portion with which the expanding portion 3 comes into contact.

Figure 2:
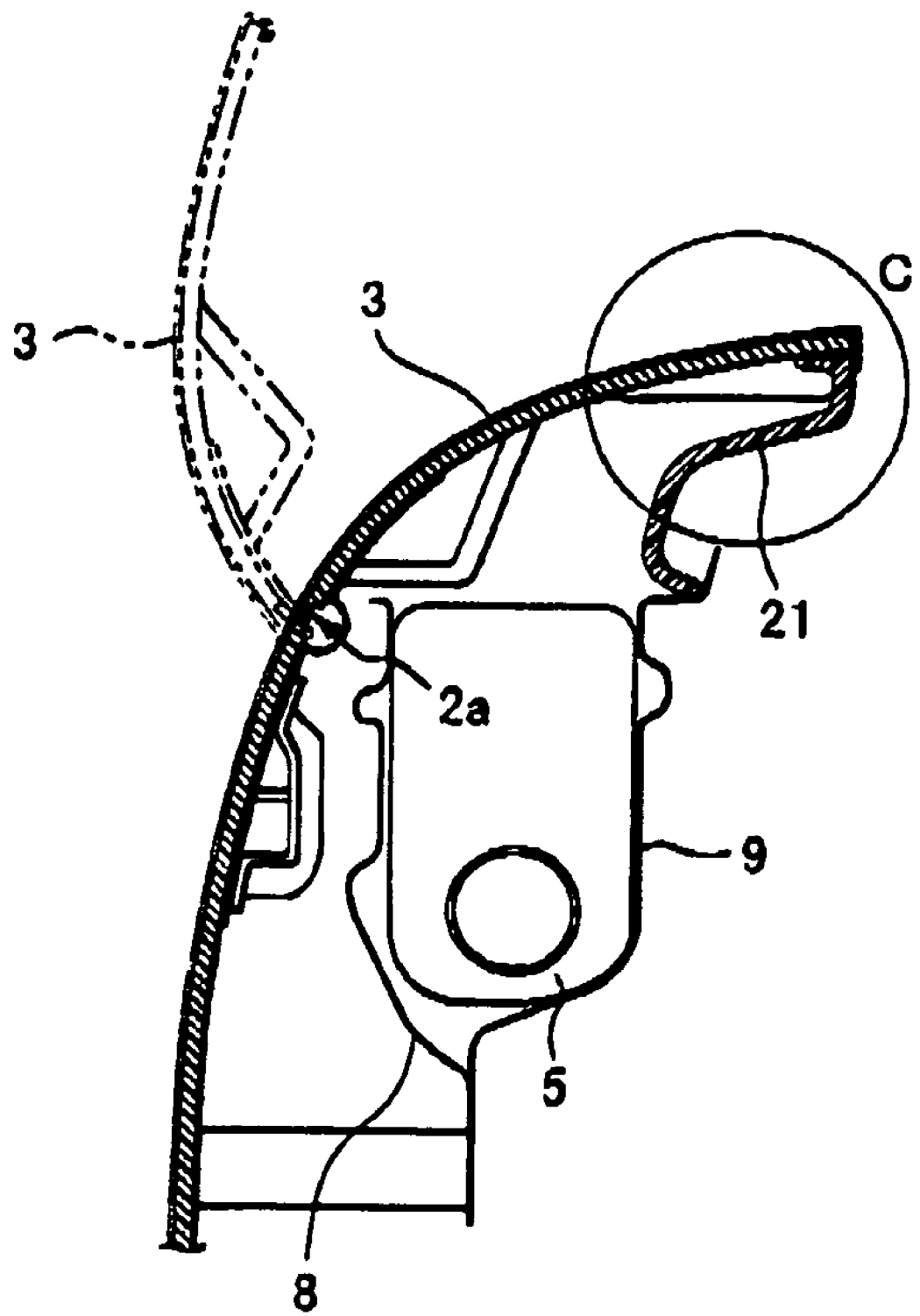
FIG. 2 is a cross section taken along the line A-A of the automotive interior component according to the present invention.

An airbag unit 5 is installed inside the upper portion of the door trim 1 (see FIG. 2). Hereinafter, this embodiment will be explained assuming that an exterior surface is set to a surface of the door trim 1 at the interior side of the vehicle. The airbag is inflated by the high pressure gas generated at the time of automotive collision to open an expanding portion 3 defined in a partial region of the upper portion of the door trim 1. Thus, the airbag inflates and expands to the vehicle interior. A plurality of tears 2 are formed on a boundary between the expanding portion 3 and the other area of the upper portion of the door trim 1. The plurality of tears 2, each of which is an elongated narrow hole, are aligned to form a boundary like a cutoff line. The tears 2 are formed with the use of laser processing equipment such that a core member of the door trim 1 is cleaved so as to allow the expanding portion 3 to turn in order to expose an opening when the expanding portion 3 is pushed up due to an inflation pressure from the inside of the airbag.

FIG. 2 is a schematic view of a cross section taken along the line A-A in FIG. 1. An inside case 8 and an outside case 9 are attached to an inner surface of the door trim 1. The airbag unit 5 is held between the inside case 8 and the outside case 9. In a state in which the door trim 1 is mounted on the vehicle body panel 2, the case 9 is fixed at a position adjacent to the vehicle body panel 22, whereas the airbag unit 5 is installed in a gap between the vehicle body panel 22 and the door trim 1.

As shown in FIG. 2, the expanding portion 3 is pushed up from the inside due to the inflation pressure of the airbag. The expanding portion 3 then turns upward and is opened about a hinged portion 2a as an axis, thereby allowing the airbag to inflate and expand to the vehicle interior. The hinged portion 2a is part of the boundary of the expanding portion 3 and is left without being cleaved (see FIG. 3A).

Figure 3A:
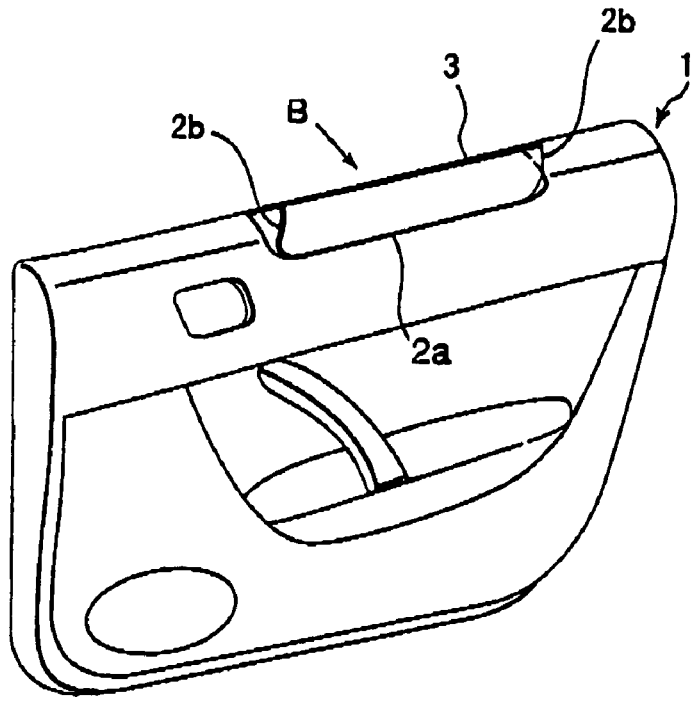
FIG. 3A is an illustrative view of the automotive interior component according to the present invention.

FIG. 3A is an illustrative view showing a state in which the expanding portion 3 is pushed up and opened due to the inflation pressure of the airbag. Side rims 2b of the expanding portion 3 are cleaved and separated due to the inflation pressure, from the other area of the door trim 1, whereas an area 2a connected to the door trim 1 functions as the hinged portion. The area 2a also serves as a turning axis when the expanding portion 3 turns upward as indicated by the arrow in FIG. 3A.

Figure 3B:
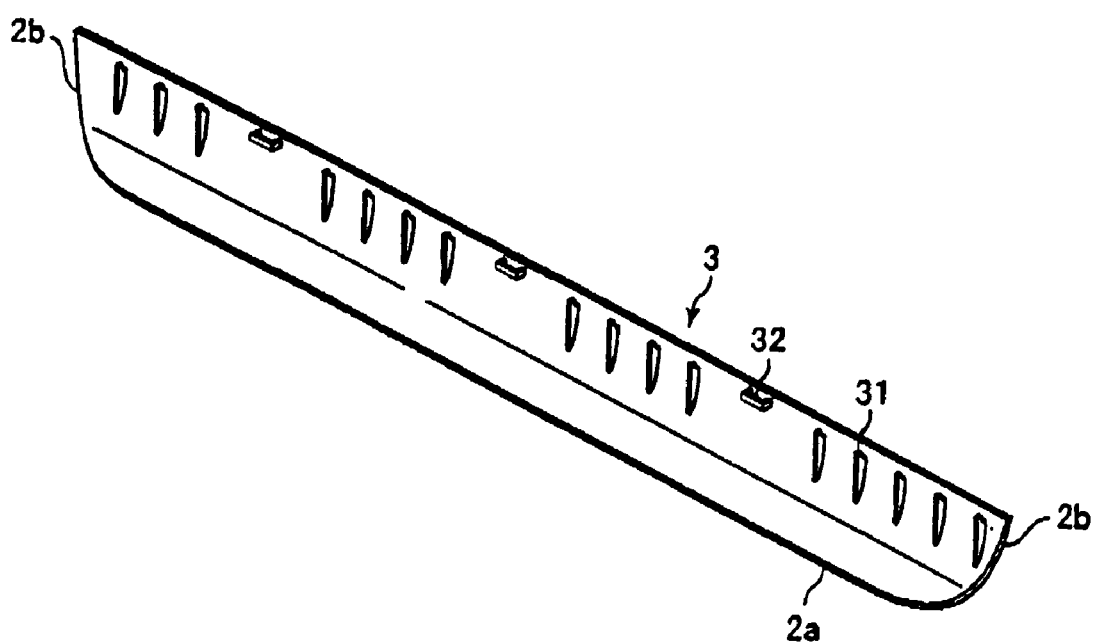
FIG. 3B is a schematic view of an expanding portion of the automotive interior component according to the present invention.

FIG. 3B is a schematic view of the expanding portion 3 as viewed in the direction B shown in FIG. 3A. The ribs 31 and the hooks 32 are disposed on the expanding portion 3, at the inner side of the rim which serves as an outer edge while the expanding portion 3 turns. The ribs 31 engage with the rib receivers 34 provided at the waist garnish 21 to limit movement of the expanding portion 3 in a turning direction (see FIG. 5A). The ribs 31 are disposed at longer intervals in an area in which the hooks 32 are disposed. As described later, this area in which the ribs 31 are disposed at longer intervals is initially pushed up, and the adjacent ribs 31 are then disengaged from the rib receivers 34 when the expanding portion 3 is pushed up and opened due to the inflation pressure of the airbag, whereby the expanding portion 3 is turned smoothly.

Figure 4:
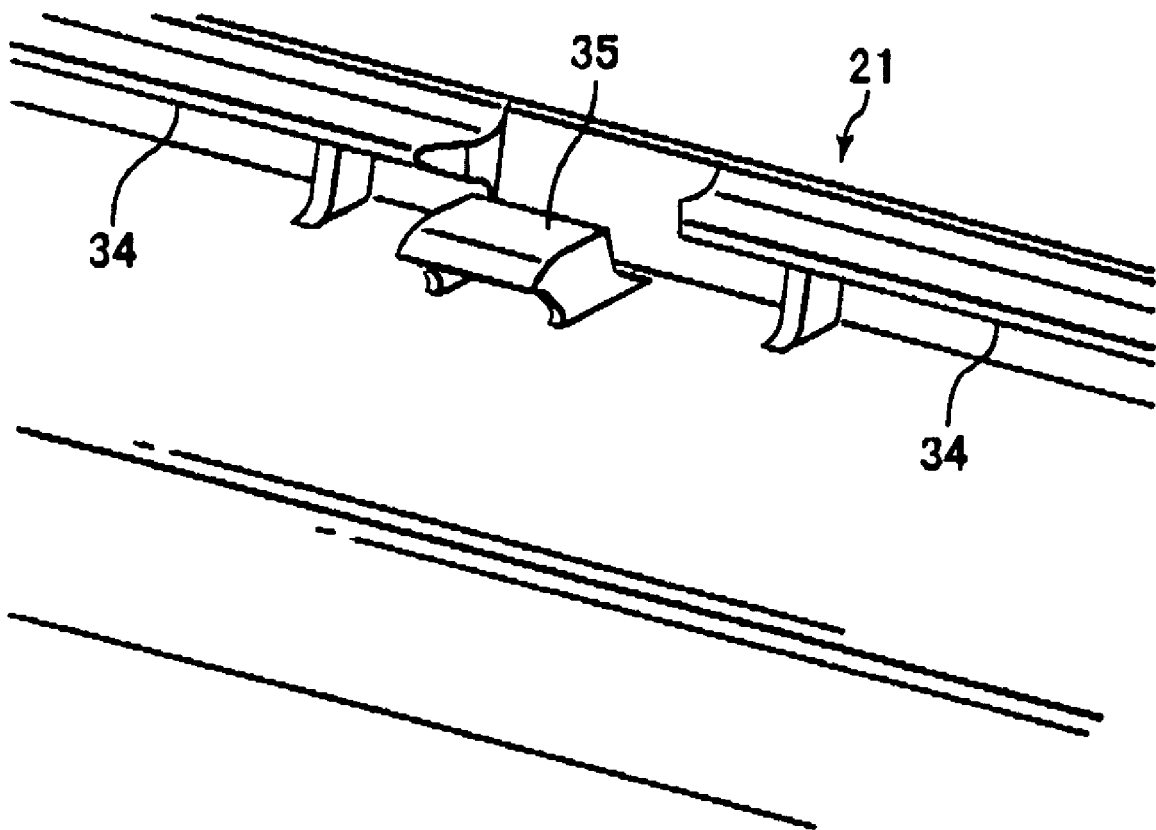
FIG. 4 is a schematic view of an engagement portion as locking means according to the present invention.

FIG. 4 is a schematic view showing the upper side portion of the waist garish with which the expanding portion 3 comes into contact. The rib receiver 34 and the hook receivers 35 are provided in which the ribs 31 serving as the first locking piece of the first locking means engage with the rib receivers 34 and the hooks 35 serving as the second locking piece of the second locking means engage with the hook receivers 35.

Figure 5A:
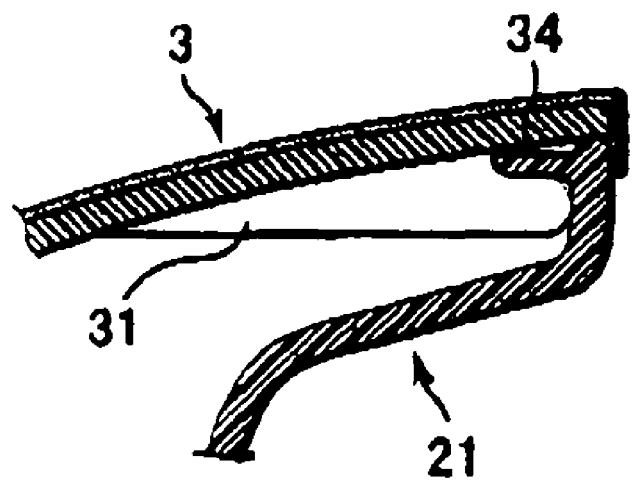
FIG. 5A is a schematic view showing an engagement state of the locking means according to the present invention.
Figure 5B:
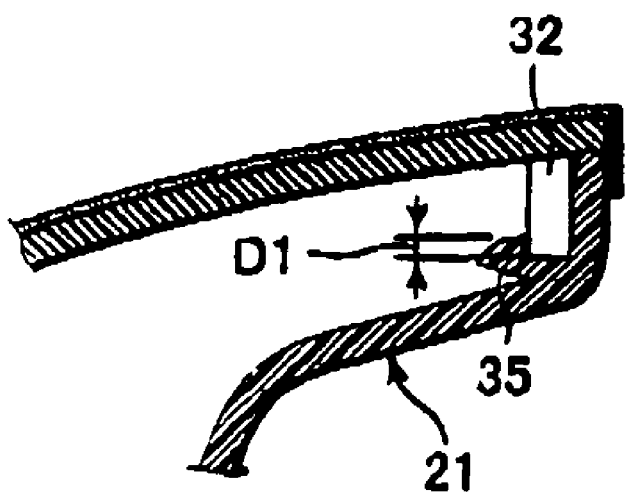
FIG. 5B is a schematic view showing an engagement state of the locking means according to the present invention.

FIGS. 5A and 5B are schematic views each showing a state in which the first locking means and the second locking means engage in the area in which the end portion of the expanding portion 3 comes into contact with the waist garnish 21 (see part C in FIG. 2). FIG. 5A shows a state in which a distal projection of the rib 31 is in mutual engagement with a protrusive portion of the rib receiver 34 to lock the expanding portion 3 onto the waist garnish 21. In this manner, movement of the expanding portion 3 is locked in the turning direction. FIG. 5B shows a locking state in which a distal end of the hook 32 fits into the hook receiver 35. In this manner, movement of the expanding portion 3 is locked in the turning radial direction. In a case where fitting of the hook 32 into the hook receiver 35 has a too large fitting width D1, the hook 32 hardly disengages from the hook receiver 35. Therefore, this fitting width is set within a range in which the hooks 32 can disengage without resistance when the expanding portion 32 is pushed up and opened due to the inflation pressure of the airbag.

Figure 6A:
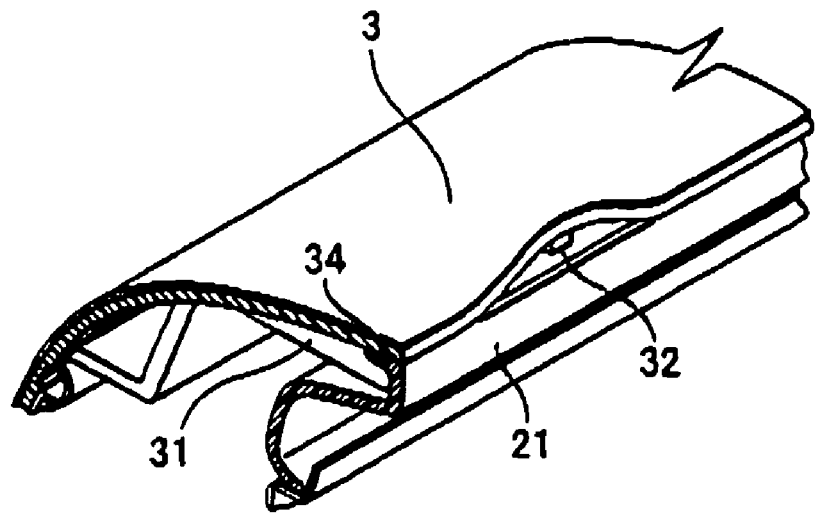
FIG. 6A is an illustrative view of the expanding portion of the automotive interior component according to the present invention.
Figure 6B:
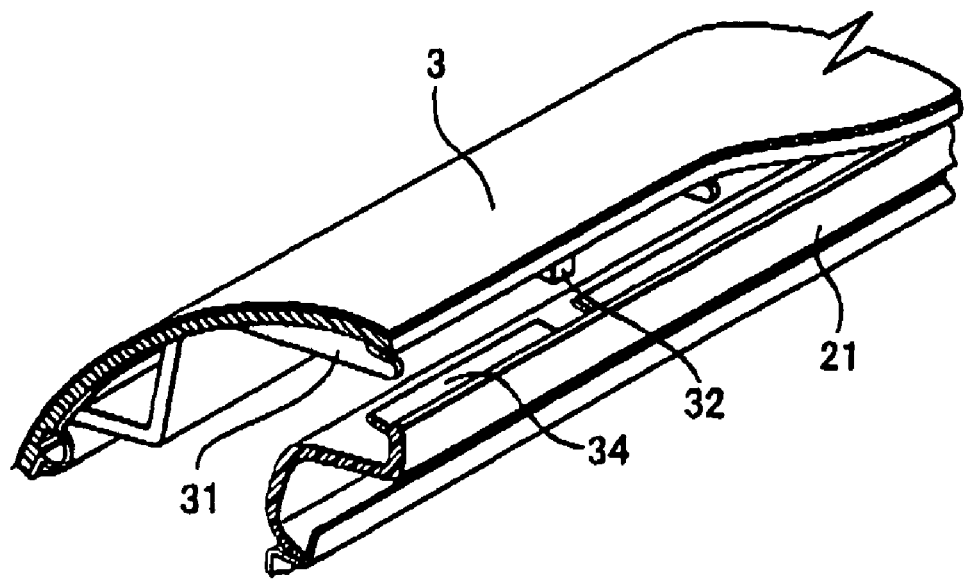
FIG. 6B is an illustrative view of the expanding portion of the automotive interior component according to the present invention.

FIGS. 6A and 6B are illustrative views schematically showing variation in the rim of the expanding portion 3 when the expanding portion 3 is pushed up and opened due to the inflation pressure of the airbag. FIG. 6A shows a state in which the region having the ribs 31 disposed at longer intervals is pushed up to become deformed, thereby being separated from the waist garnish 21. In this embodiment, each of the hooks 32 is provided at the center of the longer interval between the ribs 31. The hooks 32 limit only movement of the expanding portion 3 in the turning radial direction, i.e., the fore-and-aft movement with respect to the direction of the waist garnish 21. Thus, the hooks 32 disengage from the hook receivers 35 without resistance when the expanding portion 3 moves upward. FIG. 6A shows a state in which the hook 32 disengages from the hook receiver 35 to rise up with the deformation of the expanding portion 3.

Next, the expanding portion 3 is further deformed as expansion and inflation of the airbag advance; and the adjacent ribs 31 are pulled and displaced, and are disengaged from the rib receivers 34. FIG. 6B shows this disengagement state. As expansion and inflation of the airbag further advance, the ribs 31 adjacent to the disengaged ribs 31 are sequentially disengaged one after another, whereby a lock in the turning direction due to the engagement between the ribs 31 and the rib receivers 34 is released. As a result, turning of the expanding portion 3 becomes possible, an opening is performed, and the airbag expands and inflates in the vehicle and can perform its own function.

As described above, according to the present invention, the engagement between the ribs 31 and the rib receivers 34 as the first locking means limits movement of the expanding portion 3 in the turning direction and prevents the automotive interior component from being undulated when attached to a vehicle panel, thereby improving the alignment quality. On the other hand, in disposition of the ribs 31, an area in which the ribs 31 are disposed at longer intervals is partially provided, thereby allowing the expanding portion 3 to turn at the time of expansion and inflation of the airbag.

Further, the movement in the turning radial direction is limited, and the alignment quality is improved, by disposing the hooks 32 and the hook receivers 35 serving as the second locking means. In this case, as shown in the above-described embodiment, it is preferable that the second locking means be disposed in the area in which the ribs 31 are disposed at longer intervals. This is because the area in which the ribs 31 are disposed at longer intervals is inevitably reduced in locking strength and is reinforced by disposing the second locking means.

As described above, by carrying out the present invention, the alignment quality is assured when the vehicle interior component is attached to the vehicle body panel and the appearance of the interior component can be improved.

First Embodiment

In order for the first locking means and the second locking means according to the first embodiment to have their own functions, thereby attaining an effect of the invention, the fitting width D1 of the hook 32 (see FIG. 5B) and intervals between the disposed ribs 31 need to be adjusted in accordance with a layout of the vehicle interior and a design of the interior component to which the present invention is applied.

Figure 7:
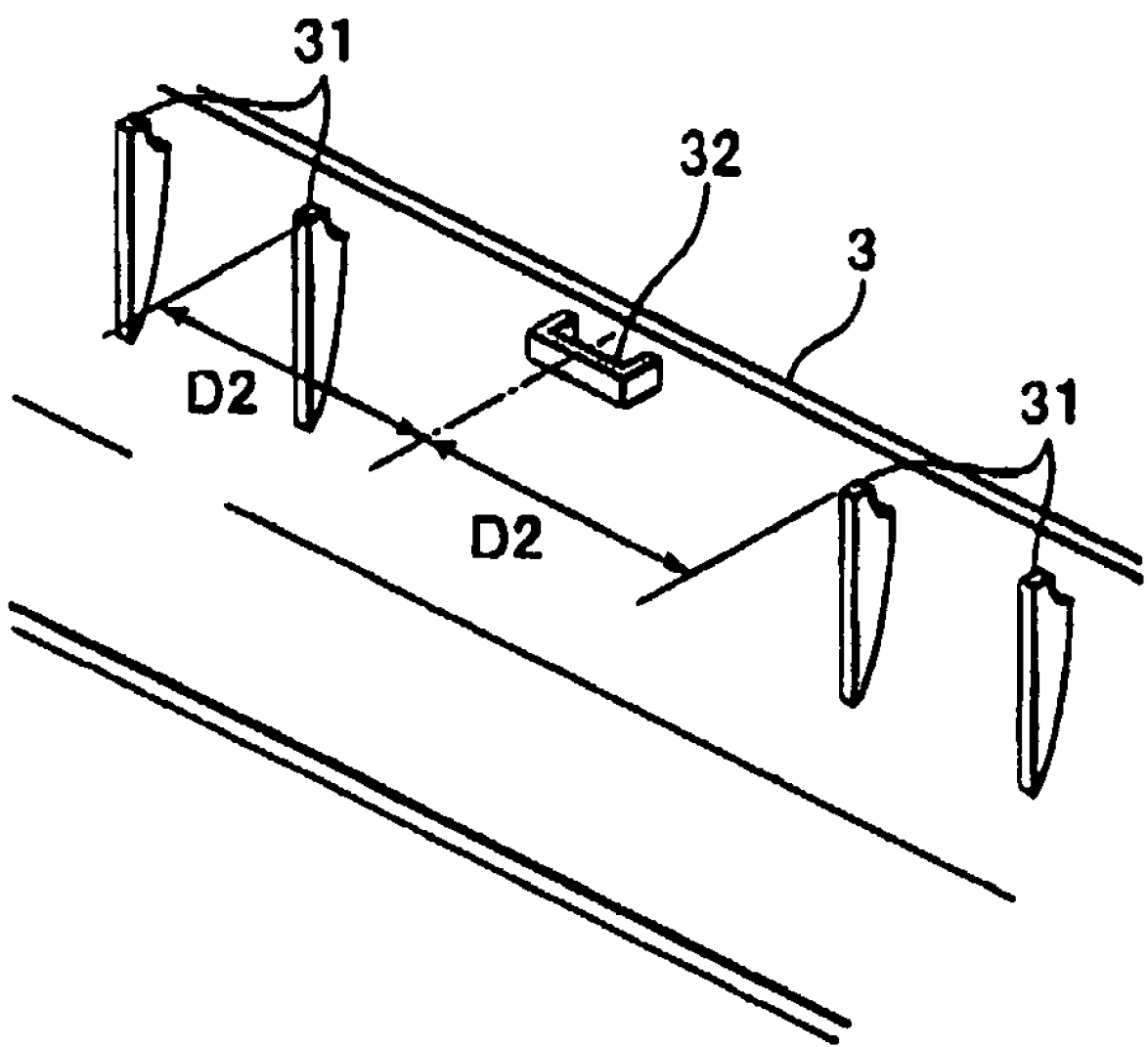
FIG. 7 is a schematic view of the expanding portion of the automotive interior component according to the present invention.

FIG. 7 is a schematic view of the area in which the ribs 31 are disposed at a longer interval and in which the hook 32 is disposed at the center. Distance D2 between the hook 32 and the rib 31 is set to a design parameter. With the interior component made of hard material, there is a need to reduce the fitting width D1 of the hook 32 and to widen the distance D2 between the hook 32 and the rib 31. Where the present invention is applied to the door trim 1 molded by blending a polycarbonate (PC) resin and an acrylonitrile butadiene styrene (ABS) resin, in a case where the width D1 and the distance D2 are set to 1 mm or smaller and 50 nm or greater, respectively, it was found that the alignment quality is assured without an occurrence of the undulation in the expanding portion 3 and no appearance degradation occurs.

Second Embodiment

Figure 8A:
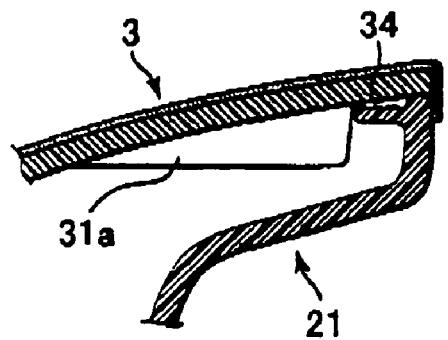
FIG. 8A is an illustrative view of an expanding portion according to a second embodiment of the present invention.

FIG. 8A is a schematic view showing third locking means according to another embodiment of the present invention. The third locking means is made up of ribs 31a serving as a third locking piece, and rib receivers 34 serving as a third engagement portion. The ribs 31a are provided at the expanding portion 3. The rib receivers 34 are provided at the waist garnish 21 serving as a fixed portion with which the rim of the expanding portion 3 comes into contact. The rib receivers 34 receive the ribs 31a to lock movement of the expanding portion 3 in the turning radial direction. As shown in FIG. 8A, in a state in which the expanding portion 3 is closed, the rib 31a is in abutment with the distal end of the rib receiver 34 to restrict the expanding portion 3 from moving in the turning radial direction, i.e., to the waist garnish 21. On the other hand, movement of the expanding portion 3 is not limited in the turning direction. Therefore, like the second locking means described above, the third locking means also does not interfere with turning of the expanding portion 3.

Figure 8B:
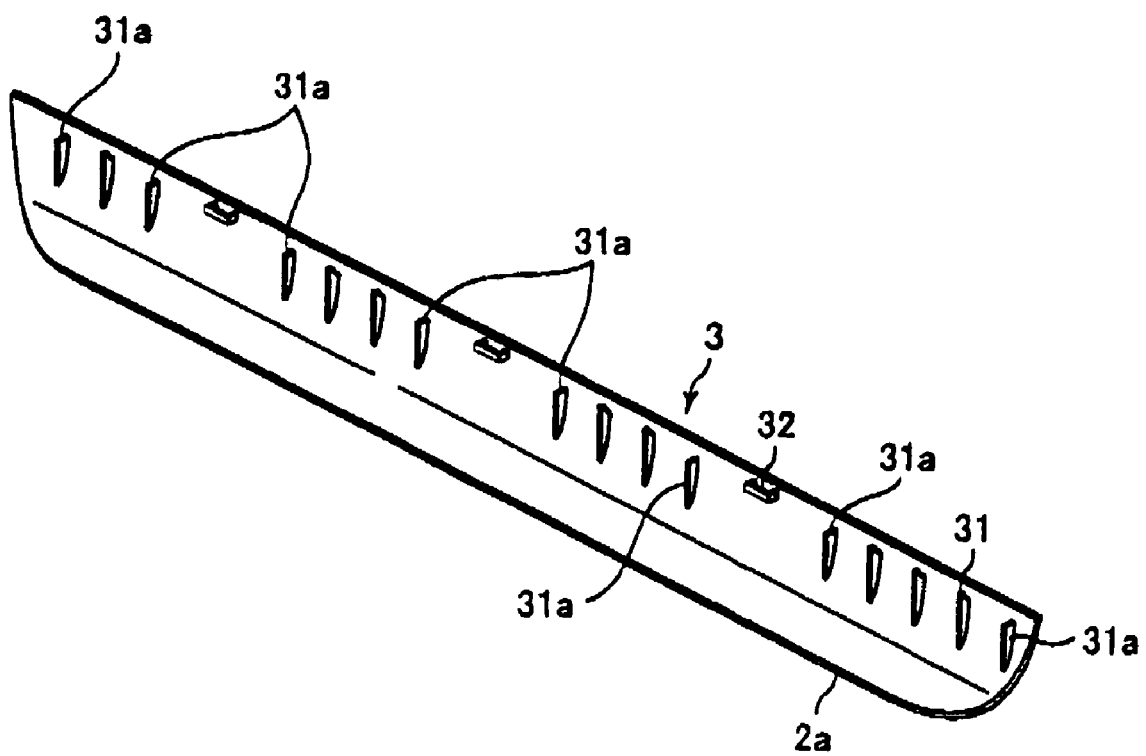
FIG. 8B is an illustrative view of the expanding portion according to the second embodiment of the present invention.

FIG. 8B is an illustrative view schematically showing how the ribs 31, the ribs 31a, and the hooks 32 are disposed on the inner surface of the expanding portion 3. The ribs 31, the ribs 31a, and the hooks 32 are disposed along the rim of the expanding portion 3. The ribs 31a are disposed on both sides of each hook 32, at which movement of the expanding portion 3 in the turning direction is not limited, as described above. Therefore, when the airbag inflates and expands, as described with reference to FIG. 6, expansion is started while the area in which the hooks 32 and the ribs 31a are disposed is defined as a starting point of turning of the expanding portion 3, and the ribs 31 adjacent to the ribs 31a then sequentially disengage one after another. The ribs 31a are also disposed at the end portions of the expanding portion 3, and the expansion is started at the end portions as well when the airbag inflates and expands. In this manner, the boundary between the expanding portion 3 provided with the tears 2 and the main body of the door trim 1 can be easily cleaved, thereby achieving the stable expansion of the expanding portion 3.

Third Embodiment

Figure 9:
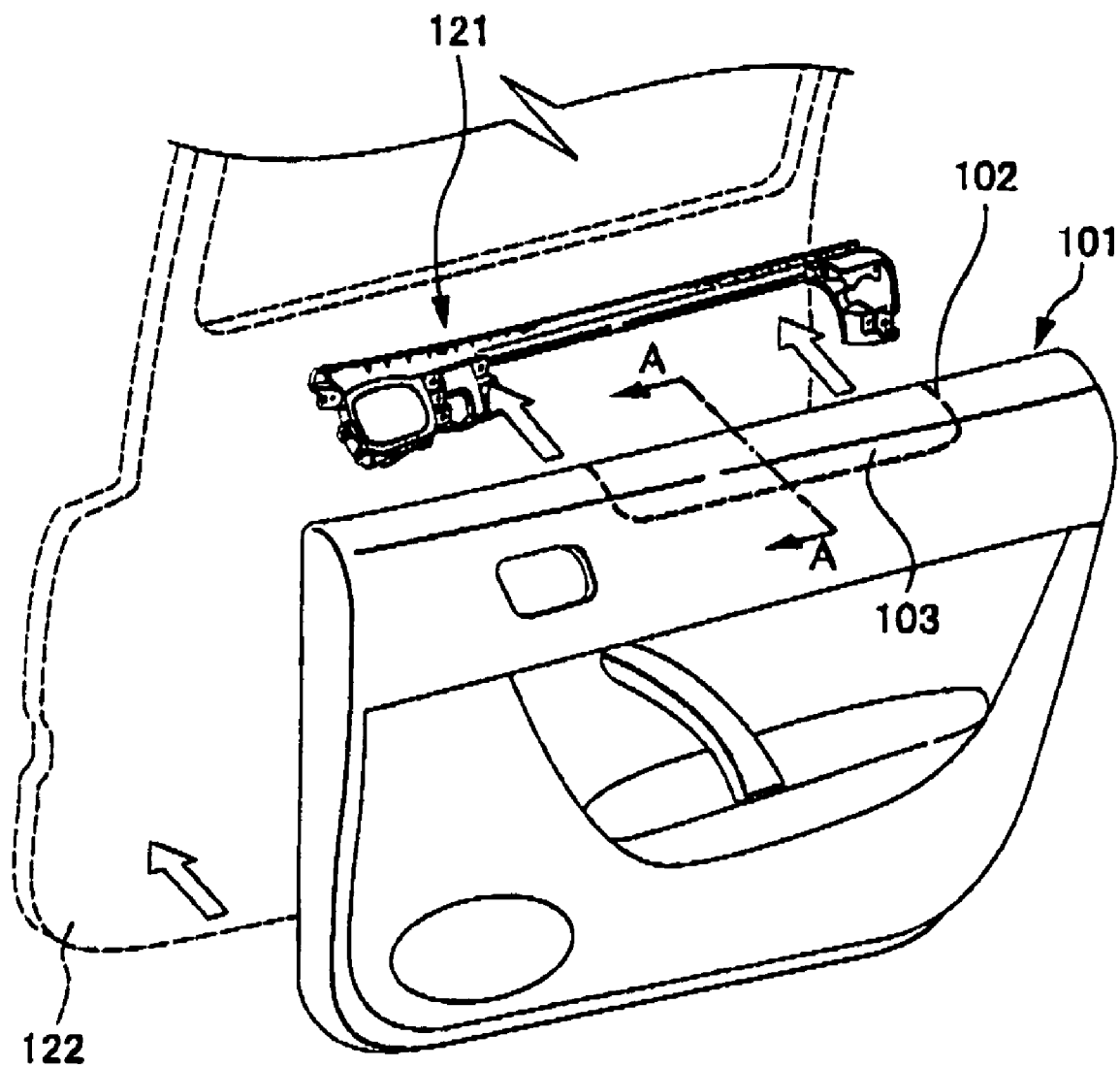
FIG. 9 is a schematic view illustrating an automotive interior component according to a third embodiment of the present invention.

FIG. 9 is a schematic view of a door trim 101 as viewed from the interior side of the vehicle. The upper portion of the door trim 101 as the interior component is fixed to a vehicle body panel 122 via a waist garnish 121 attached to the vehicle body panel 122.

The upper side portion of the waist garnish 121 is in abutment with the upper portion rim of the door trim 1, i.e., the so-called waistline, of the door trim 101. As in the first embodiment, the upper side portion is provided, along a part thereof in contact with a rim of an expanding portion 103, with the first engagement portions (rib receivers 134) for receiving the first locking pieces (ribs 131) as the first locking means and second engagement portions (hook receivers 35) for receiving second locking pieces (hooks 132) as the second locking means. In this embodiment, the first locking means is made up of the ribs 131 and the rib receivers 134, whereas the second locking means is made up of the hooks 132 and the hook receivers 35. The waist garnish 121 is a fixed portion with which the expanding portion 103 comes into contact.

Figure 10:
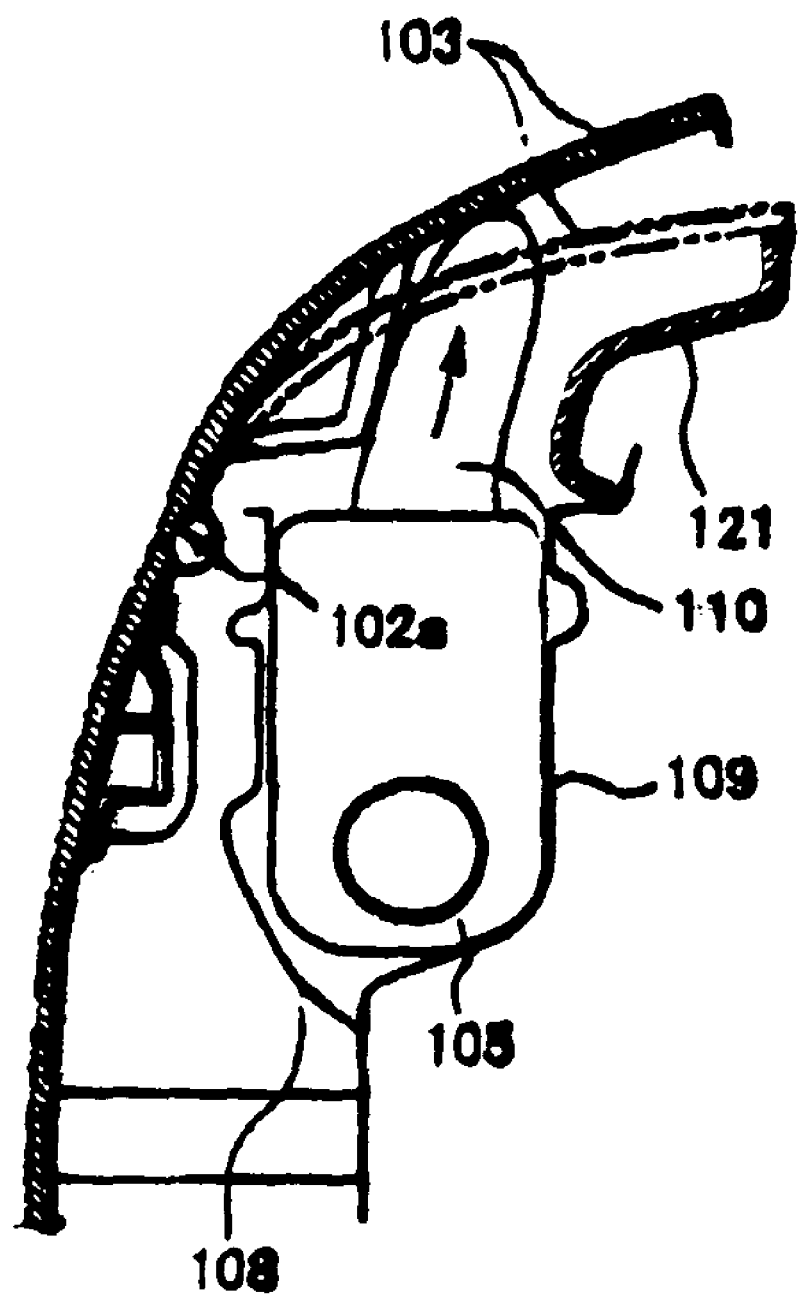
FIG. 10 is a cross section taken along the line A-A of the automotive interior component according to the third embodiment of the present invention.

FIG. 10 is a schematic cross-sectional view taken along the line A-A in FIG. 9. An inside case 108 and an outside case 109 are attached to an inner surface of the door trim 101. An airbag unit 105 is held between the inside case 108 and the outside case 109. In a state in which the door trim 101 is mounted on the vehicle body panel 122, the outside case 109 is fixed at a position adjacent to the vehicle body panel 122 whereas the airbag unit 105 is installed in a gap between the vehicle body panel 122 and the door trim 101.

As shown in FIG. 10, the expanding portion 103 is pushed up from the inside due to the inflation pressure of the airbag 110 and turns up to be opened about a hinged portion 102a as an axis, thereby allowing the airbag 110 to inflate and expand to the vehicle interior. The hinged portion 102a is part of the boundary of the expanding portion 103 and is left without being cleaved (see FIG. 11).

Figure 11:
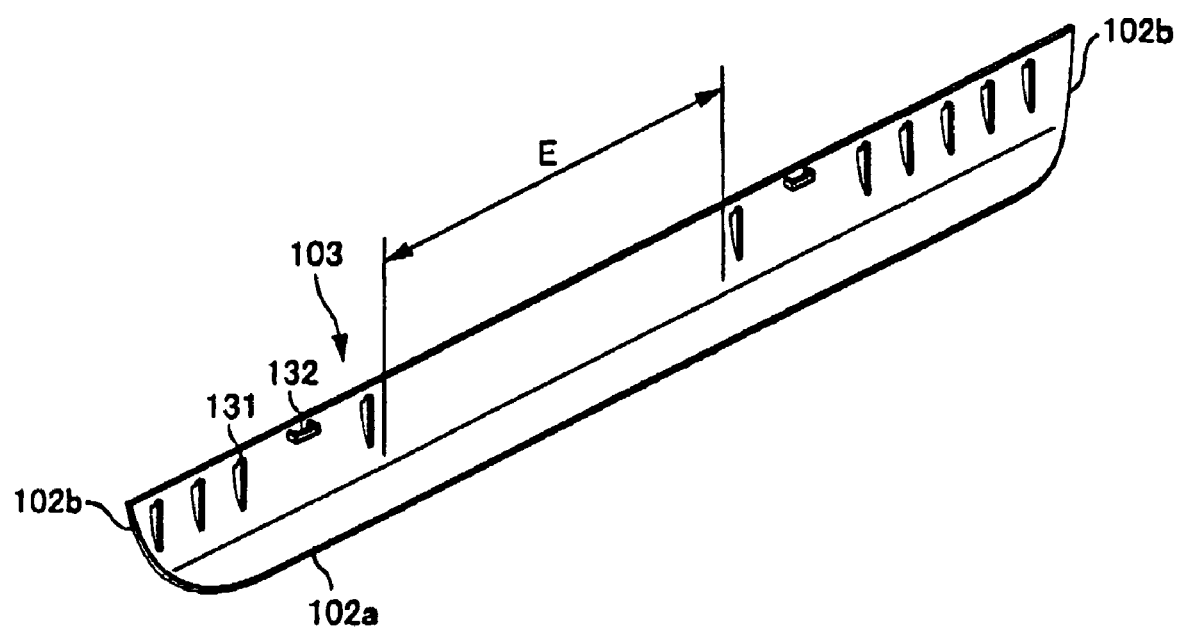
FIG. 11 is a schematic view of an expanding portion of the automotive interior component according to the third embodiment of the present invention.

FIG. 11 is a schematic view of the expanding portion 103. The ribs 131 and the hooks 132 are disposed on the expanding portion 103, at the inner side of the rim which serves an outer edge during turning of the expanding portion 103. The ribs 131 engage with the rib receivers 134 provided at the waist garnish 121 to limit movement of the expanding portion 103 in the turning direction. The ribs 131 are disposed at longer intervals in an area in which the hooks 132 are disposed. Therefore, when the expanding portion 103 is pushed up by the inflation pressure of the airbag 110, part of the airbag 110, other than a front end portion 111 thereof, pushes up the area in which the ribs 131 are disposed at longer intervals. In this manner, the ribs 131 adjacent to the hooks 132 are disengaged from the rib receivers 134, allowing the expanding portion 3 to turn smoothly. The hooks 132 limit only movement of the expanding portion 103 in the turning radial direction, i.e., the fore-and-aft movement with respect to the direction of the waist garnish 121. Thus, the hooks 132 disengage from the hook receivers 35 without a resistance when the expanding portion 103 moves upward.

The ribs 131 and the hooks 132 are disposed in a region other than region E with which the front end portion 111 of the airbag 110 comes into contact at the beginning of the expansion of the airbag 110. This region E is the first place with which the airbag 110 comes into contact with the expanding portion 103 at the initial phase of expansion of the airbag 110. According to this structure, an inflation-expansion force of the airbag 110 is not released in the direction of the exterior side of the vehicle, so that the airbag 110 can easily push up the region E, allowing the airbag 110 to exert a force enough to push up the expanding portion 103, thereby disengaging the hooks 132 from the hook receivers 35 to achieve smooth expansion in the original expansion direction. The rib receivers 134 and the hook receivers 35 are placed at positions corresponding to the ribs 131 and the hooks 132, respectively, so as to fix the region other than the region E of the expanding portion 103.

Figure 12A:
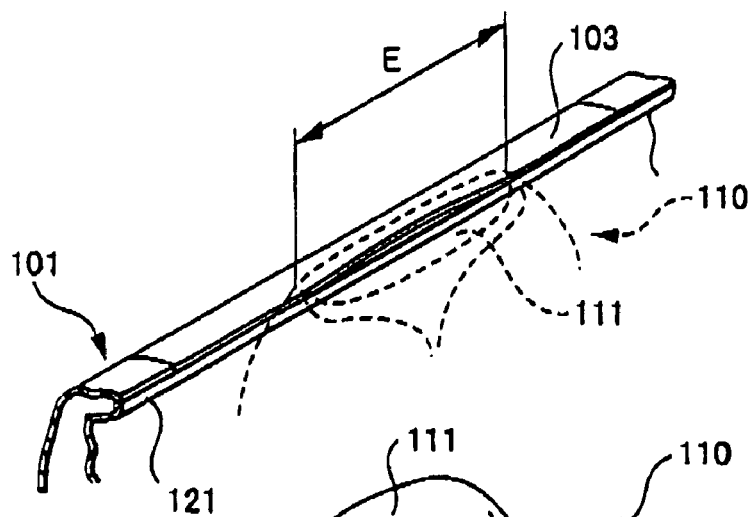
FIG. 12A is an illustrative view schematically showing the expanding portion and an airbag when the expanding portion according to the third embodiment of the present invention is pushed up and opened due to an inflation pressure of the airbag.
Figure 12B:
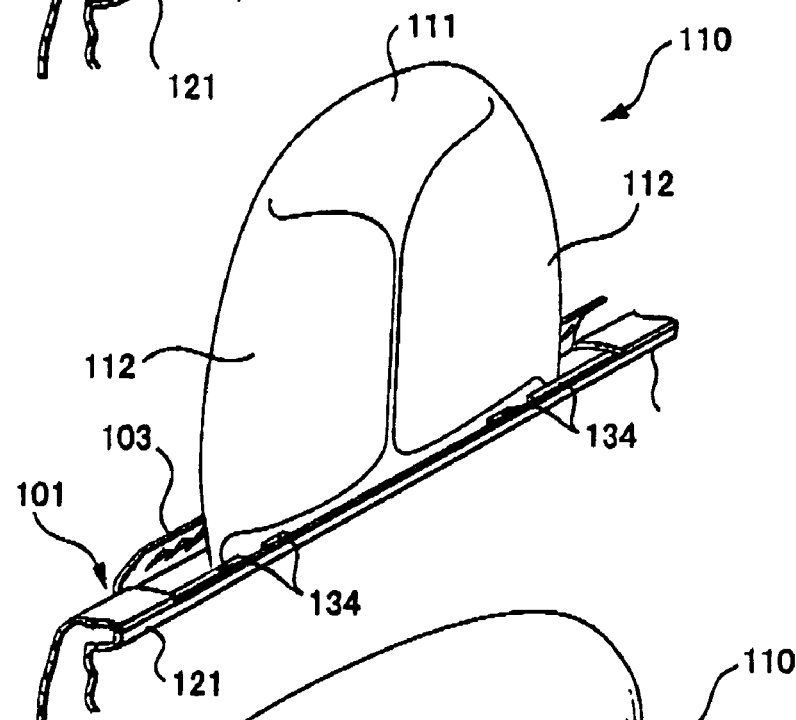
FIG. 12B is an illustrative view schematically showing the expanding portion and the airbag when the expanding portion according the third embodiment of the present invention is pushed up and opened due to the inflation pressure of the airbag.
Figure 12C:
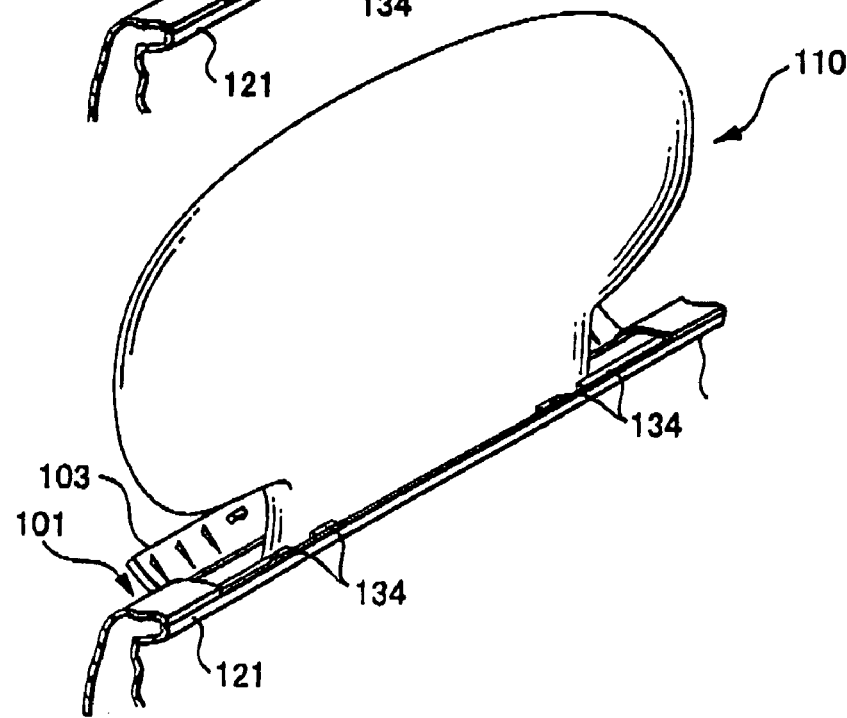
FIG. 12C is an illustrative view schematically showing the expanding portion and the airbag when the expanding portion according to the third embodiment of the present invention is pushed up and opened due to the inflation pressure of the airbag.

FIGS. 12A, 12B, and 12C are views of the door trim 101 in FIG. 9, as viewed from the exterior side of the vehicle, schematically showing the expanding portion 103 and the airbag 110 when the expanding portion 103 is pushed up and opened by the inflation pressure of the airbag 110. As shown in FIG. 12A, when the airbag 110 starts inflating and expanding, the front end portion 111 of the airbag 110 in an expansion operation comes into contact with the region E of the expanding portion 103. As described above, the region E is not provided with the ribs 131 and the hooks 132 for fixing the expanding portion 103 to the waist garnish 121 (see FIG. 11). The waist garnish 121 has an area corresponding to the region E, at which the rib receivers 134 and the hook receivers 35 are not provided. This enables the front end portion 111 of the airbag 110 to easily push up the region E of the expanding portion 103 with the inflation pressure of the airbag 110.

The expanding portion 103 is further deformed, as expansion and inflation of the airbag 110 advance. The ribs 131 adjacent to the region E are then pulled to the region E, are displaced, and are disengaged from the rib receivers 134. As expansion and inflation of the airbag 110 further advance, the ribs 131 adjacent to the ribs 131 having been disengaged from the rib receivers 134 are disengaged one after another, whereby a lock in the turning direction, due to the engagement between the ribs 131 and the rib receivers 134, is released. As a result, the entire airbag 110 expands to the vehicle interior as shown in FIG. 12B.

Subsequently, folded portions 112 of the airbag 110 is left unfolded, as shown in FIG. 12C. At this stage, the expansion of the airbag 110 is completed, so that the airbag 110 can have its own function.

Fourth Embodiment

Figure 13A:
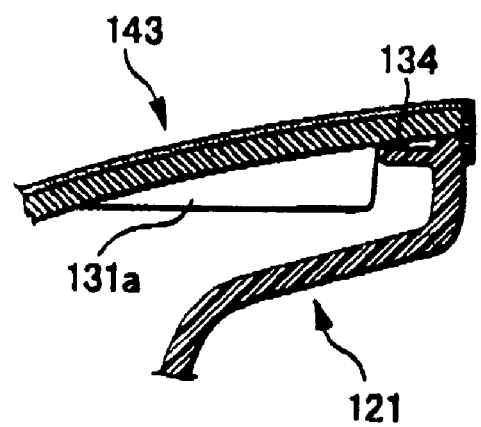
FIG. 13A is a schematic view showing an engagement state of locking means according to a fourth embodiment of the present invention.

FIG. 13A is a schematic view showing an engagement state of locking means according to a fourth embodiment of the present invention. In this embodiment, the third locking means is made up of ribs 131a and rib receivers 134. The ribs 131a are provided at an expanding portion 143. The rib receivers 134 are provided at the waist garnish 121 serving as a fixed portion with which the rim of the expanding portion 143 comes into contact. The rib receivers 134 receive the ribs 131a to lock movement of the expanding portion 143 in the turning radial direction. As shown in FIG. 13A, in a state in which the expanding portion 143 is closed, the rib 131a is in abutment with the distal end of the rib receiver 134 to restrict the expanding portion 143 from moving in the turning radial direction, i.e., moving to the waist garnish 121. On the other hand, movement of the expanding portion 143 is not limited in the turning direction. Therefore, like the second locking means described above, the third locking means does not interfere with turning of the expanding portion 143.

Figure 13B:
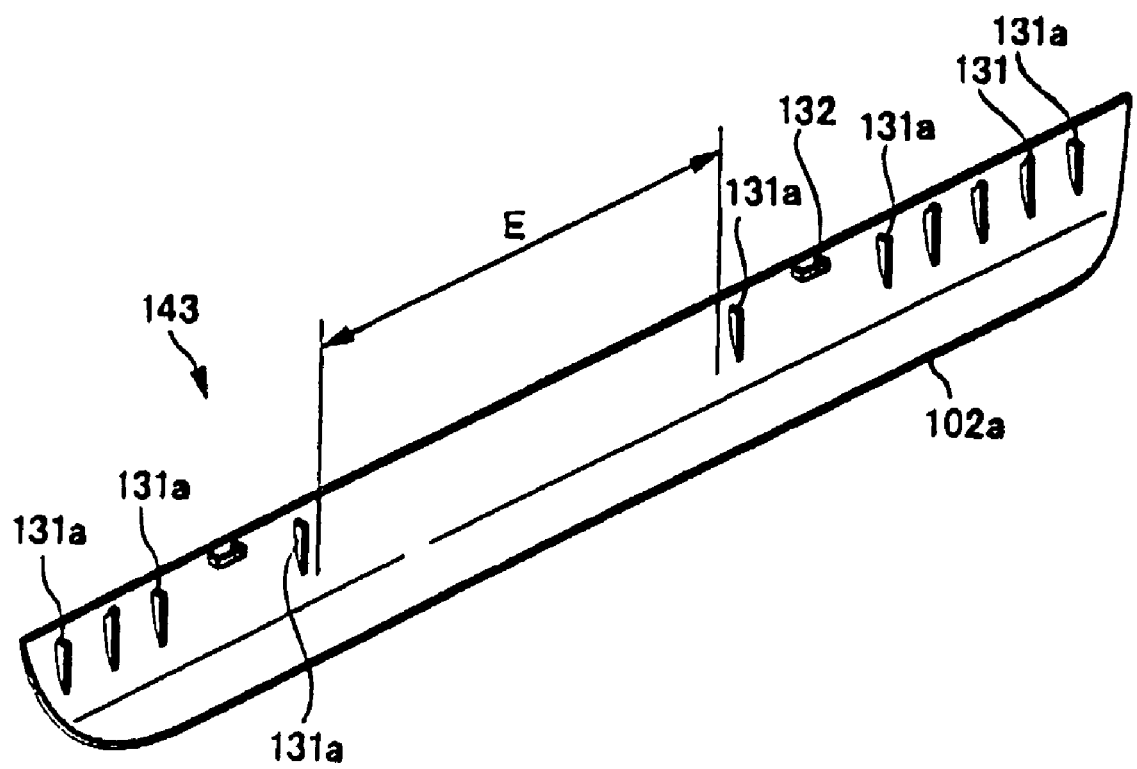
FIG. 13B is a schematic view of an expanding portion according to the fourth embodiment of the present invention.

FIG. 13B is a schematic view of the expanding portion according to the fourth embodiment of the present invention. On the expanding portion 143, the ribs 131, the ribs 131a, and the hooks 132 are disposed along the rim of the expanding portion 143, except the region E with which the front end portion 111 of the airbag 110 comes into contact at the beginning of the expansion of the airbag 110. The ribs 131a are disposed on both sides of the region E as well as both sides of each book 132, at which movement of the expanding portion 143 in the turning direction is not limited, as described above. Therefore, when the airbag 110 inflates and expands, as described with reference to FIGS. 12A, 12B, and 12C, expansion is started while the region E and the area in which the ribs 131a are disposed, are defined as a starting point of turning of the expanding portion 143, and the hooks 132a adjacent to both sides of the region E are sequentially disengaged from the rib receivers 134.

As described above with reference to FIGS. 12A, 12B, and 12C, the airbag 110 can easily push up the region E, so that a force can be applied in only the upward direction as the original expansion direction thereof. Therefore, the ribs 131a and the hooks 132 that are positioned at both sides of the region E are easily separated from the rib receivers 134 and the hook receivers 35. The ribs 131a are disposed at the end portions of the expanding portion 143, so that the expansion is started at the end portions when the part of the airbag 110 other than the front end portion 111 thereof comes in contact with the end portion, at the time of inflation and expansion of the airbag 110. In this manner, the boundary between the expanding portion 143 provided with tears 102 and the main body of the door trim 101 can be easily cleaved, thereby achieving the stable expansion of the expanding portion 143.

While the preferred embodiments of the present invention were described in detail hereinbefore, the present invention is not limitative to the above-described examples, and various modifications and alterations can occur without departing from the spirit of the claimed invention.

What is claimed is:

1. An automotive interior component, comprising:
   an interior component attached to a vehicle body panel at an interior side of a vehicle;
   an airbag installed in a gap between the vehicle body panel and the interior component;
   an expanding portion defined in a partial region of the interior component, the expanding portion turning in an expansion direction of the airbag to expose an opening;
   first locking means provided at a rim of the expanding portion, the rim being serving as an outer edge during turning of the expanding portion, the first locking means being made up of:
      a first locking piece provided at the expanding portion; and
      a first engagement portion provided at a fixed portion with which the rim of the expanding portion comes into contact, receiving the first locking piece to lock movement of the expanding portion in a turning direction; and
   second locking means provided at the rim of the expanding portion, the second locking means being made up of:
      a second locking piece provided at the expanding portion; and a second engagement portion provided at the fixed portion with which the rim of the expanding portion comes into contact, receiving the second locking piece to lock movement of the expanding portion in a turning radial direction.

2. The automotive interior component according to claim 1, wherein:

the plurality of first locking means are disposed along the rim of the expanding portion; and the automotive interior component includes an area in which the first locking means are disposed at relatively longer intervals to disengage the first locking means so as to facilitate turning of the expanding portion at a time of inflation and expansion of the airbag.

3. The automotive interior component according to claim 2, wherein:

the second locking means is provided between the first locking means disposed at relatively longer intervals.

4. The automotive interior component according to claim 1, wherein:

the plurality of first locking means are disposed along the rim of the expanding portion; and the automotive interior component further includes:

third locking means disposed in an area adjacent to the second locking means and an area adjacent to end portions of the expanding portion to disengage the first locking means so as to facilitate turning of the expanding portion at a time of inflation and expansion of the airbag, the third locking means being made of:

a third locking piece provided at the expanding portion; and a third engagement portion provided at the fixed portion with which the rim of the expanding portion comes into contact, receiving the third locking piece to lock movement of the expanding portion in the turning radial direction.

5. An automotive interior component, comprising:

an interior component main body attached to a vehicle body panel at an interior side of a vehicle;

an airbag installed in a gap between the vehicle body panel and the interior component main body;

an expanding portion defined in a partial region of the interior component main body, the expanding portion turning in an expansion direction of the airbag to expose an opening;

a locking piece provided at a rim of the expanding portion, the rim being serving as an outer edge during turning of the expanding portion; and an engagement portion provided at a fixed portion with which the rim of the expanding portion comes into contact, receiving the locking piece to lock movement of the expanding portion in a turning direction, wherein:

the locking piece and the engagement portion are provided at a region other than a predetermined region with which a front end portion of the airbag comes into contact at beginning of expansion of the airbag.

6. The automotive interior component according to claim 5, further comprising:

first locking means disposed at the rim of the expanding portion, the rim being serving as an outer edge during turning of the expanding portion, the first locking means being made up of:

a first locking piece provided at the expanding portion; and a first engagement portion being provided at the fixed portion with which the rim of the expanding portion comes into contact, receiving the first locking piece to lock movement of the expanding portion in the turning direction; and second locking means disposed at the rim of the expanding portion, the second locking means being made up of:

a second locking piece provided at the expanding portion; and a second engagement portion provided at the fixed portion with which the rim of the expanding portion comes into contact, receiving the second locking piece to lock movement of the expanding portion in a turning radial direction.

\* \* \* \* \*